3,127,415
3-SUBSTITUTED-3-PYRROLIDINOLS
Yao Hua Wu, Rolland Frederick Feldkamp, and William Andrew Gould, Evansville, Ind., assignors to Mead Johnson & Company, Evansville, Ind., a corporation of Indiana
No Drawing. Filed Aug. 14, 1961, Ser. No. 131,066
7 Claims. (Cl. 260—326.5)

This invention concerns a series of 3-aryl-3-pyrrolidinols and processes for their preparation. The substances claimed herein include those of the following formula and the acid addition salts thereof.

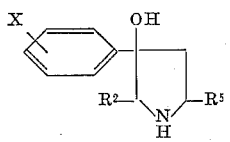

In the above formula one or both of $R^2$ and $R^5$ are hydrogen atoms or lower aliphatic hydrocarbon groups having up to about four carbon atoms such as alkyl, or alkylene. In any event, at least one of $R^2$ and $R^5$ is an alkyl or alkylene group. X represents a sterically large, bulky substituent connected to the 3-phenyl ring and is selected from phenoxy, halophenoxy, phenyl, halophenyl, benzhydryloxy, and benzyloxy groups of the following formula

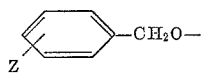

in which Z is selected from the group consisting of hydrogen, halo, dihalo, alkoxy, and alkyl, each of said alkoxy and alkyl groups having up to about four carbon atoms. The pharmaceutically acceptable acid addition salts are also contemplated as members of the group of novel substances claimed herein.

This application is a continuation-in-part of our co-pending application Serial No. 2,571, filed January 15, 1960, which in turn is a continuation-in-part of our previously filed application Serial No. 792,712, filed February 12, 1959, and now abandoned.

The compounds of the present invention have utility as therapeutic agents. They possess various useful pharmacological properties including vasopressor-depressor effects, coronory dilator, peripheral vasodilator and vasoconstrictor activity, and papaverine-like smooth muscle depressant effects. The latter particularly characterizes the series. These substances depress many types of mammalian smooth muscles, including the normal actions thereof and also spastic states. They do not appear to function by any particular hormonal blocking action, such as cholinergic or adrenergic blocking action, and have the property of relaxing smooth muscle in the spastic state, regardless of the agent or hormone responsible for the condition.

The specificity of individual substances of the present invention for various types of smooth muscle varies from one member of the series to another. Thus, some are useful as uterine relaxants, others as intestinal antispasmodics, others as coronary dilators, and still others as ureteral relaxants. The compounds of the present invention may be administered for pharmaceutical purposes by the oral or parenteral routes in doses ranging from 3 to 120 mg./kg. of body weight. Various types of pharmaceutical disage formulations may be employed, including tablets, capsules, elixirs, solutions, suspensions, etc. Such compositions may contain the present compounds as the sole active ingredient, or they may be combined with other ingredients to provide complementary pharmacologic effects.

3-(4-benzyloxyphenyl)-2-methyl-3-pyrrolidinol, 3-(4-phenoxyphenyl)-2-methyl-3-pyrrolidinol, 3-(4-biphenylyl)-2-methyl-3-pyrrolidinol, and 3-(4-benzoyloxyphenyl)-5-methyl-3-pyrrolidinol and their pharmaceutically acceptable salts represent preferred embodiments of the present invention. They have increased depressant specificity for smooth muscle of the uterus and intestine, and have low toxicities and little effect on the central nervous system.

The compounds of the present invention are prepared from the corresponding 1-acyl or 1-carbalkoxy-3-pyrrolidinols having the formula

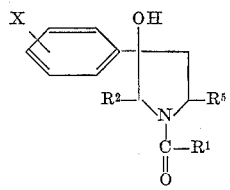

in which the groups X, $R^2$ and $R^5$ have the same meaning as indicated above, and $R^1$ is a lower alkyl or lower alkoxy group. These intermediates are prepared as described in co-pending applications Serial No. 109,269, filed May 11, 1961, by Wu, Feldkamp, and Lobeck, which in turn is a continuation-in-part of application Serial No. 792,711, filed February 12, 1959. The preparation is carried out by hydrolysis or alcoholysis of these intermediates in the presence of strongly alkaline materials such as sodium methoxide, potassium t-butoxide, sodium hydroxide, potassium hydroxide, or calcium oxide, alkoxide, or hydroxide. Strong acid conditions are usually to be avoided since dehydration with loss of the 3-hydroxyl group is likely to occur. The reaction may be conveniently carried out by treatment of the 1-acyl-3-aryl-3-pyrrolidinol with potassium hydroxide in refluxing aqueous n-propanol.

Those products where X represents a substituted benzyloxy group including benzylhydryl, may also be prepared by reaction of the corresponding 1-acyl or 1-carbalkoxy-3-(hydroxyphenyl-3-pyrrolidinol with the desired benzyl halide (e.g., chloride, bromide, or iodide) in the presence of a strong base and a solvent for the reactants. Nearly any reaction inert solvent that will dissolve appreciable quantities of each reactant and of the base employed may be used. The combination of anhydrous acetone and potassium carbonate has been found to be the most universally satisfactory. The base, such as potassium carbonate, must be sufficiently strong to neutralize the phenolic hydroxyl group participating in the process. Such bases are known to those skilled in the art, i.e., bicarbonates generally are too weak while alkali metal carbonates and hydroxides are generally satisfactory.

The intermediate hydroxyphenyl compounds are prepared by hydrogenolysis of the corresponding 1-acyl or 1-carbalkoxy-3-(benzyloxyphenyl)-3-pyrrolidinols, as is described in the above co-pending application Serial No. 109,269. As a final step, the 1-acyl or 1-carbalkoxy-3-(substituted benzyloxyphenyl) - 3 - pyrrolidinol resulting from reaction with the benzyl halide, is hydrolyzed as described above.

The pharmaceutically acceptable acid addition salts are prepared by reaction of the present pyrrolidinols with the appropriate acid. For example, the pyrrolidinols may be dissolved in ether or other suitable solvent and treated with the desired acid. Pharmaceutically acceptable salts include the hydrobromides, hydrochlorides, hydroiodides, sulfates, phosphates, acetates, citrates, gluconates, succinates, tartrates, mucates, and benzoates, etc.

The following examples are provided to illustrate the preparation of specific compounds of the present invention. The scope of the invention is not to be considered as limited to these specific embodiments, however.

EXAMPLE 1

1-carbethoxy-2-methyl-3-(4-benzyloxyphenyl)-3-pyrrolidinol, 0.1 mole (application Serial No. 109,269), is stirred at the reflux temperature for 20 hours with a solution of 25 g. of potassium hydroxide in a mixture of 50 ml. each of n-propyl alcohol and 50 ml. of 10 N aqueous potassium hydroxide. The mixture is then cooled, diluted with water, and the precipitated product, the free base form of 2-methyl-3-(4-benzyloxyphenyl)-3-pyrrolidinol, collected on a filter and washed with water. This material is dried and then dissolved in about 150 ml. of hot isopropanol per gram thereof, and treated with an equal volume of an isopropanol solution containing one equivalent of hydrogen chloride. The isopropanol solution is then permitted to cool with crystallization of 2-methyl-3-(4-benzyloxyphenyl)-3-pyrrolidinol hydrochloride. This material is recrystallized several times from ethanol until the melting point is unchanged on further recrystallization, M.P. 218–219° C., dec. The purified product on analysis by standard microanalytical techniques is found to have the composition given in Table I. The observed composition is in substantial agreement with the percentage composition calculated from the empirical formula indicated by the structure given in the table. This substance exhibits infrared absorption maxima at 1025, 1100, 1490, 1699, 2780, 2880, 2920, 3050, and 3300 cm.$^{-1}$ (potassium bromide pellet).

EXAMPLES 2, 4, 6, 7, AND 8

The procedure of Example 1 is applied to the following starting materials, the preparation of each being described in application Serial No. 109,269, cited above. The melting point, composition, and recrystallization solvent, as well as the structure of each of the products obtained, is given in Table I.

1-carbethoxy-2-methyl-3-(3-benzyloxyphenyl)-3-pyrrolidinol 1-carbethoxy-3-(4-benzyloxyphenyl)-5-methyl-3-pyrrolidinol 1-carbethoxy-2-methyl-3-[4-(4-chlorobenzyloxy)phenyl]-3-pyrrolidinol 1-carbethoxy-2,5-dimethyl-3-(4-benzyloxyphenyl)-3-pyrrolidinol 1-carbethoxy-2-ethyl-3-(4-benzyloxyphenyl)-3-pyrrolidinol

EXAMPLE 3

1-carbethoxy-2-methyl-3-(4-phenoxyphenyl)-3-pyrrolidinol, 0.1 mole (application Serial No. 109,269), is stirred at the reflux temperature for 20 hrs. with a solution of 25 g. of potassium hydroxide in a mixture of 50 ml. each of n-propyl alcohol and 50 ml. of 10 N aqueous potassium hydroxide. The mixture is then cooled, the alcoholic layer separated, and diluted with 400 ml. of diisopropyl ether. The ether layer is separated and dried over anhydrous magnesium sulfate. The drying agent is then removed by filtration and the filtrate treated with one equivalent of ethanoic hydrogen chloride, resulting in precipitation of 2-methyl-3-(4-phenoxyphenyl)-3-pyrrolidinol hydrochloride. This product is recrystallized from methanol-isopropyl ether to provide the purified product, M.P. 242–243° C. It is found on analysis by standard microanalytical techniques to have the composition given in Table I. The observed composition is in substantial agreement with the percentage composition calculated from the empirical formula corresponding to the structure given in the table. This substance exhibits infrared absorption maxim at 1025, 1100, 1490, 1600, 2780, 2880, 2920, 3050, 3300 cm.$^{-1}$ (potassium bromide pellet).

EXAMPLE 5

The procedure of Example 3 is repeated, substituting 0.1 mole of 1-carbethoxy-2-methyl-3-(4-biphenylyl)-3-pyrrolidinol (application Serial No. 109,269) as the starting material. The product obtained is described in Table I and the recrystallization solvent listed there.

Each of the compounds of the foregoing examples exhibits infrared absorption maxima at the following wave lengths, 1025, 1100, 1490, 1600, 2780, 2880, 2920, 3050 and 3300 cm.$^{-1}$ (potassium bromide pellet). Furthermore, each of these and the other products of this invention contains two or more asymmetric carbon atoms and are, therefore, capable of existing in various isomeric modifications, including optical isomers and diastereoisomers. Each such form of these products is considered within the scope of the present invention.

The Grignard reagent of 4,4'-dibromobiphenyl is prepared in the usual manner by reaction of 0.3 mole thereof with 0.3 gram atom of magnesium turnings in 200 ml. of tetrahydrofuran. A solution of 38.3 g. (0.2 mole) of 1-carbethoxy-2-ethyl-5-methyl-3-pyrrolidinone (application Serial No. 109,269) in 100 ml. of tetrahydrofuran is then added in dropwise fashion with stirring to the Grignard solution. The reaction mixture is stirred and refluxed for two hours and the entire contents of the reaction vessel then poured into a mixture of 500 g. of crushed ice and 50 g. of ammonium chloride. The organic layer is separated and the aqueous layer is extracted

Table I

3-ARYL-3-PYRROLIDINOLS OF EXAMPLES 1-8

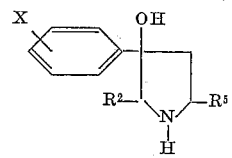

| Example number | X | R² | R⁵ | Melting point, ° C. | Observed percentage composition ||||  Recrystallization solvent [1] | Salt |
|---|---|---|---|---|---|---|---|---|---|---|
| | | | | | C | H | Cl | N | | |
| 1 | 4-C₆H₅CH₂O | CH₃ | H | 218–219 (dec.)[2] | 67.39 | 7.00 | | 4.40 | EtOH | HCl. |
| 2 | 3-C₆H₅CH₂O | CH₃ | H | 139–141 | 67.30 | 6.87 | 11.04 | | i-PrOH:i-Pr₂O | HCl. |
| 3 | 4-C₆H₅O | CH₃ | H | 242–243 | 66.54 | 6.48 | 11.56 | | MeOH:i-Pr₂O | HCl. |
| 4 | 4-C₆H₅CH₂O | H | CH₃ | 182–184 (dec.)[3] | 67.61 | 7.03 | 11.35 | | i-PrOH:i-Pr₂O | HCl. |
| 5 | 4-C₆H₅ | CH₃ | H | 250–251 | 70.48 | 6.98 | 12.37 | | MeOH:i-Pr₂O | HCl. |
| 6 | 4-(4-Cl-C₆H₄CH₂O) | CH₃ | H | 210–211 (dec.) | 61.00 | 6.07 | 20.24 | | i-PrOH:i-Pr₂O | HCl. |
| 7 | 4-C₆H₅CH₂O | CH₃ | CH₃ | 239–240 | 68.55 | 7.53 | 10.60 | | EtOH | HCl. |
| 8 | 4-C₆H₅CH₂O | C₂H₅ | H | 164–166 | 73.88 | 6.89 | | 3.31 | i-PrOH | Benzoate. |

[1] Chemical Abstracts abbreviations.
[2] Benzoate salt, M.P. 165–167° C; anal. found: C, 73.76; H, 6.29; N, 3.50; recryst. solvent, i-PrOH.
[3] Benzoate salt, M.P. 168–170° C; anal. found: C, 74.10; H, 6.83; N, 3.59; recryst. solvent, i-PrOH.

several times with additional portions of tetrahydrofuran, the combined organic solutions dried over magnesium sulfate, and the solvent distilled therefrom. The resulting intermediate, 1-carbethoxy-2-ethyl-3-(4'-bromo-4-biphenylyl)-5-methyl-3-pyrrolidinol is obtained as a solid residue which is recrystallized to remove unreacted starting material and other impurities. This intermediate is then converted to the desired 2-ethyl-3-(4'-bromo-4-biphenylyl)-5-methyl-3-pyrrolidinol hydrochloride according to the method of Examples 1–8.

In this fashion the substances listed in Table II are prepared from 1-carbethoxy-2-ethyl-5-methyl-3-pyrrolidinone and the halides listed.

Table II
2-ETHYL-3-ARYL-5-METHYL-3-PYRROLIDINOLS

| Product | Halide |
| --- | --- |
| 2-ethyl-3-(3-biphenylyl)-5-methyl-3-pyrrolidinol | 3-bromobiphenyl. |
| 2-ethyl-3-[4-(4-chlorophenoxy)phenyl]-5-methyl-3-pyrrolidinol. | 4,4'-dichlorodiphenyl ether. |
| 2-ethyl-3-[4-(4-bromophenoxy)phenyl]-5-methyl-3-pyrrolidinol. | 4,4'-dibromodiphenyl ether. |

EXAMPLE 10

A mixture of 0.027 mole of 2-chlorobenzyl chloride and 0.027 mole of 1-carbethoxy-3-(4-hydroxyphenyl)-2-methyl-3-pyrrolidinol (described in application Serial No. 109,269), 5.63 g. (0.041 mole) of anhydrous potassium carbonate and 15 ml. of acetone is stirred and refluxed for 5 hours. The reaction mixture is then transferred to a separatory funnel containing 300 ml. of water and 300 ml. of ether. The ether layer is separated, washed with 50 ml. of 10% aqueous sodium hydroxide, with water, dried and the solvent distilled. The 1-carbethoxy-3-[4-(2-chlorobenzyloxy)phenyl]-2-methyl-3-pyrrolidinol thus obtained is treated as described in Example 1 to provide 3-[4-(2-chlorobenzyloxy)phenyl]-2-methyl-3-pyrrolidinol.

The products listed in Table III are prepared by the method of Example 10 by employing the benzyl halides indicated in that process.

Table III
3-(SUBSTITUTED-4-BENZYLOXYPHENYL)-2-METHYL-3-PYRROLIDINOLS

| Product | Halide |
| --- | --- |
| 3-[4-(3,4-dichlorobenzyloxy)phenyl]-2-methyl-3-pyrrolidinol. | 3,4-dichlorobenzyl chloride. |
| 3-[4-(4-methoxybenzyloxy)phenyl]-2-methyl-3-pyrrolidinol. | 4-methoxybenzyl chloride. |
| 3-[4-(4-fluorobenzyloxy) phenyl]-2-methyl-3-pyrrolidinol. | 4-fluorobenzyl chloride. |
| 3-[4-(4-ethylbenzyloxy)phenyl]-2-methyl-3-pyrrolidinol. | 4-ethylbenzyl chloride. |
| 3-[4-(4-bromobenzyloxy)phenyl]-2-methyl-3-pyrrolidinol. | 4-bromobenzyl bromide. |
| 3-(4-benzhydryloxyphenyl)-2-methyl-3-pyrrolidinol | Benzhydryl bromide. |

Compositions in dosage unit form containing the compounds of this invention may be prepared by conventional pharmacetutical methods. For this purpose both solid and liquid carriers, excipients, and diluents may be used along with suspending agents, stabilizers, preservatives, lubricants, etc., as desired. Examples of suitable carriers include corn starch, lactose, calcium phosphate, polyethylene glycol, water, sesame oil, peanut oil, propylene glycol, ethanol, etc. Dosage unit forms such as tablets or capsules for oral use and ampoules of solutions or suspensions for injection containing from 100 to 400 mg. of active ingredient are suitable.

The physician will determine the specific dosage form, size, and frequency for each individual patient. The range of suitable dosages has been stated above. Single doses of the order of 100 to 400 mg. are preferred. Specific examples of suitable dosage unit compositions are given below.

EXAMPLE 11

Tablets containing 2-methyl-3-(4-benzyloxyphenyl)-3-pyrrolidinol hydrochloride are prepared as follows:

| Ingredients | Weight per tablet, mg. | Weight per 100,000 tablets, kg. |
| --- | --- | --- |
| 2-methyl-3-(4-benzyloxyphenyl)-3-pyrrolidinol hydrochloride | 200 | 20.0 |
| Calcium phosphate, dibasic | 100 | 10.0 |
| Lactose | 70 | 7.0 |
| Starch, corn | 28 | 2.8 |
| Magnesium stearate | 2 | 0.2 |
| Total weight | 400 | 40.0 |

For a 100,000 tablet batch the above amounts of 2-methyl-3-(4-benzyloxyphenyl)-3-pyrrolidinol hydrochloride, calcium phosphate, lactose and 2.2 kg. of the corn starch are dry blended and then wet granulated with 6 kg. of 10% aqueous corn starch paste. The resulting granulation is screened, dried, and rescreened. The granules are then coated with the magnesium stearate, which serves as a tableting lubricant, and the finished granules are compressed into tablets weighing 400 mg. each, using ordinary tableting equipment and methods.

EXAMPLE 12

A dry blend of the following ingredients is prepared:

|  | Kg. |
| --- | --- |
| 3-(4-benzyloxyphenyl)-5-methyl-3-pyrrolidinol hydrochloride | 20.0 |
| Lactose | 4.8 |
| Magnesium stearate | 0.2 |
| Total | 25.0 |

This mixture is then employed to fill No. 2 hard gelatin capsules, each with 250 mg. of the blend. If desired, larger capsules having a fill weight of 500 mg. of this composition may be employed.

EXAMPLE 13

A solution for injection is prepared as follows: 3-(4-benzyloxyphenyl)-2,5-dimethyl-3-pyrrolidinol hydrochloride, 100 g., is dissolved in 9.5 l. of water for injection, U.S.P., containing 10% by weight of propylene glycol. The pH of the solution is adjusted to 5.7±0.1 using dilute aqueous sodium hydroxide or hydrochloric acid as required. The solution is then diluted to 10 l. with aqueous propylene glycol having the composition indicated above, filtered sparkling clear, and 10 ml. portions thereof are filled into each of a group of ampoules made of Type I glass. The ampoules are sealed and sterilized by heating in an autoclave at 121° C. for 15 minutes. This formulation is adapted for intravenous administration.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of

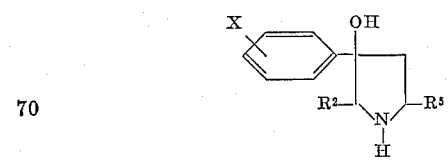

and the pharmaceutically acceptable acid addition salts thereof wherein X is selected from the group consisting of phenoxy, halophenoxy, phenyl, halophenyl, benzyhydryloxy and

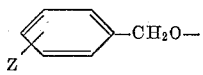

wherein Z is selected from the group consisting of halo, dihalo and alkoxy groups having up to four carbon atoms, and R² and R⁵ are independently selected from the group consisting of hydrogen and lower alkyl groups having up to four carbon atoms, at least one of said R² and R⁵ being a lower alkyl group.

2. A compound as claimed in claim 1 wherein X is halobenzyloxy, R² is a lower alkyl group, and R⁵ is hydrogen.

3. A compound as claimed in claim 1 wherein X is phenyl, R² is a lower alkyl group and R⁵ is hydrogen.

4. A compound as claimed in claim 1 wherein X is phenoxy, R² is a lower alkyl group and R⁵ is hydrogen.

5. 3 - [4 - (4-chlorobenzyloxy)phenyl]-2-methyl-3-pyrrolidinol.

6. 3-(4-phenoxyphenyl)-2-methyl-3-pyrrolidinol.

7. 3-(4-biphenylyl)-2-methyl-3-pyrrolidinol.

References Cited in the file of this patent

UNITED STATES PATENTS

| | | |
|---|---|---|
| 2,852,526 | Villani et al. | Sept. 16, 1958 |
| 2,864,825 | Heinzelman et al. | Dec. 16, 1958 |
| 2,878,264 | Lunsford | Mar. 17, 1959 |
| 2,916,417 | Horrom | Dec. 8, 1959 |
| 2,937,119 | Berger et al. | May 17, 1960 |

OTHER REFERENCES

Wagner Zook: "Synthetic Organic Chemistry," page 415 (1953), John Wiley and Sons, Inc.

UNITED STATES PATENT OFFICE
CERTIFICATE OF CORRECTION

Patent No. 3,127,415                      March 31, 1964

Yao Hua Wu et al.

It is hereby certified that error appears in the above numbered patent requiring correction and that the said Letters Patent should read as corrected below.

Column 1, line 66, for "disage" read -- dosage --; column 2, line 40, for "(hydroxyphenyl-3-" read -- (hydroxyphenyl)-3- --; column 3, line 27, for "1699" read -- 1600 --; columns 3 and 4, Table 1, footnote 3, for "74 10" read -- 74.10 --; column 4, line 19, for "maxim" read -- maxima --; same column 4, between lines 63 and 64, insert -- EXAMPLE 9 --; column 5, Table II, under "Product", second and fourth lines thereof, the first closing brackets, each occurrence, should appear as opening brackets; same column 5, line 60, for "pharmacetutical" read -- pharmaceutical --; column 7, lines 1 and 2, for "benzyhydryloxy" read -- benzhydryloxy --.

Signed and sealed this 28th day of July 1964.

(SEAL)
Attest:

ESTON G. JOHNSON                      EDWARD J. BRENNER
Attesting Officer                    Commissioner of Patents